United States Patent

Coppola et al.

[11] Patent Number: 6,077,432
[45] Date of Patent: Jun. 20, 2000

[54] BIO-DEGRADATION OF AMMONIUM PERCHLORATE, NITRATE, HYDROLYSATES AND OTHER ENERGETIC MATERIALS

[75] Inventors: Edward N. Coppola; Glen R. McDonald, both of Panama City, Fla.

[73] Assignee: Applied Research Associates, Inc., Albuquerque, N. Mex.

[21] Appl. No.: 09/267,644

[22] Filed: Mar. 15, 1999

[51] Int. Cl.[7] ...................................................... C02F 3/30
[52] U.S. Cl. .......................... 210/611; 210/612; 210/620; 210/630; 210/205; 210/252; 210/629; 435/262.5
[58] Field of Search ..................................... 210/610, 611, 210/612, 620, 630, 201, 205, 252, 903, 629; 435/262.5

[56] References Cited

U.S. PATENT DOCUMENTS

| | | | |
|---|---|---|---|
| 3,755,156 | 8/1973 | Yakovlev et al. | 210/5 |
| 3,943,055 | 3/1976 | Korenkov et al. | |
| 5,133,877 | 7/1992 | Rofer et al. | 210/761 |
| 5,302,285 | 4/1994 | Attaway et al. | |
| 5,314,806 | 5/1994 | Morton et al. | 435/41 |
| 5,382,265 | 1/1995 | Mower | 23/302 R |
| 5,545,325 | 8/1996 | Hau et al. | 210/605 |
| 5,663,049 | 9/1997 | Barns et al. | 435/6 |
| 5,804,435 | 9/1998 | Kurane et al. | |
| 5,811,289 | 9/1998 | Lewandowski et al. | |

OTHER PUBLICATIONS

Wallace, W. et al, "Identification of an anaerobic bacterium which reduces perchlorate and chlorate as *Wolinella succinogenes*", Journal of Industrial Microbiology (1996) 16, pp. 68–72.

Bergey's Manual of Determinative Bacteriology, Ninth Edition, 1994, Williams & Wilkins, Baltimore, Maryland.

*Primary Examiner*—David A. Simmons
*Assistant Examiner*—Fred Prince
*Attorney, Agent, or Firm*—Jacobson, Price, Holman & Stern, PLLC

[57] ABSTRACT

A method and system for carrying out the bio-degradation of perchlorates, nitrates, hydrolysates and other energetic materials from wastewater, including process groundwater, ion exchange effluent brines, hydrolyzed energetics, drinking water and soil wash waters, which utilizes at least one microaerobic reactor having a controlled microaerobic environment and containing a mixed bacterial culture. By the method of the present invention, perchlorates, nitrates, hydrolysates and other energetics can be reduced to non-detectable concentrations, in a safe and cost effective manner, using readily available non-toxic low cost nutrients. The treatment of significantly higher concentrations of perchlorate, nitrate, etc. (<1.5 wt %) than was previously contemplated is made possible.

19 Claims, 2 Drawing Sheets

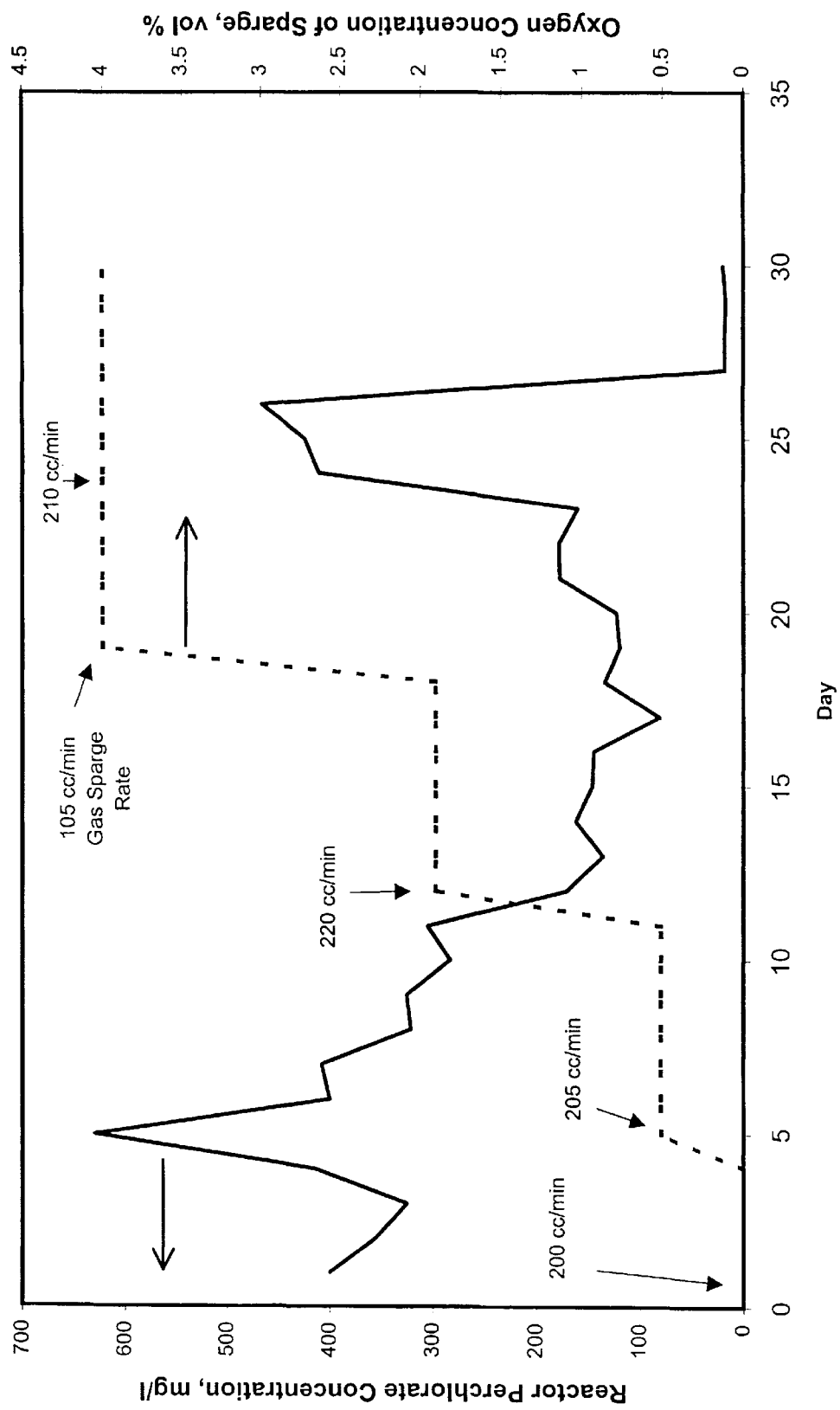

BIO-DEGRADATION OF AMMONIUM PERCHLORATE, NITRATE, HYDROLYSATES AND OTHER ENERGETIC MATERIALS

The present invention is directed to the treatment of explosive laden and associated industrial wastewaters, groundwater, and drinking water and, in particular, waters which are contaminated with ammonium perchlorate, nitrate, hydrolysates and other energetic materials.

BACKGROUND OF THE INVENTION

Present inventories of solid rocket motor (SRM) propellant slated for disposal are over 164 million pounds and increasing due to the imminent disposal requirements of the Strategic Arms Reduction Treaty. Additionally, almost 7 million pounds of waste propellant are generated annually in the U.S. as a by-product of manufacturing. Over 500,000 tons of ordnance items are stockpiled and awaiting disposal. These propellants and explosives are hazardous waste due to their inherent reactive and toxic natures.

Because these materials are complex cross-linked composites, with components that are partially or completely soluble in water, they are difficult to reclaim and reuse. Historically, open burning (OB) and open detonation (OD) have been used to dispose of these materials. However, under Resource Conservation and Recovery Act (RCRA), OB/OD has been severely limited and, in some cases, totally prohibited.

Ammonium perchlorate is the primary ingredient in most rocket propellants and is also present in lesser quantities in many ordnance items. The U.S. Environmental Protection Act (EPA) recently established a provisional reference dose for perchlorate of 32 parts-per-billion (ppb). This has caused the California Department of Health Services to close 23 drinking water wells in southern and northern California.

Separation or concentration of perchlorate in drinking water and disposal by biodegradation is one possible solution to the problem. Safe ways of containing and destroying energetic materials and wastewater generated from disposal and production activities is critically important to continued use of these materials in our nation's weapon systems.

In addition to treating perchlorate in the presence of salts and other energetic materials, other energetics themselves (nitramines, nitroglycerin, nitrates, nitroaromatics, etc.) must be destroyed. Processes to treat energetic materials must be robust, predictable, and cost-effective.

A method for treatment of such contaminated wastewater is disclosed in U.S. Pat. No. 5,302,285. The method involves reduction of perchlorate to chloride in a first stage anaerobic reactor, using a specific microorganism in mixed culture, followed by treatment of the organics produced in the first reactor in a second stage aerobic reactor. The specific microorganism is designated as HAP1 and was classified as being strictly anaerobic.

It was recently discovered that the bacterium *Wolinella succinogenes* can effectively reduce perchlorate (Wallace, W., Ward, T., Breen, A., Attaway, H. 1996 "Identification of an Anaerobic Bacterium Which Reduces Perchlorate and Chlorate as *Wolinella succinogenes*". Journal of Industrial Microbiology, 16:pp. 68–72). Although originally categorized as being an anaerobe in Bergey's Manual of Systematic Bacteriology, Vol. 1, Wolinella sp. is in fact capable of respiring with oxygen. It has also been subsequently recognized as a $H_2$ and formate requiring microaerophile (Bergey's Manual of Determinative Bacteriology, Ninth Edition, 1994).

Prior to the present invention the use of such a microorganism in the treatment of perchlorate contaminated wastewater had only been carried out in a two stage anaerobic-aerobic process. Such a process was capable of reducing perchlorate wastewater concentrations of 7750 mg per liter.

It has been surprisingly found, however, that wastewater contaminated with perchlorate, and other energetic materials, including hydrolysate products of energetic compounds, can be more effectively treated using a controlled microaerobic environment.

By the use of the present invention and the use of a controlled microaerobic environment as opposed to a strictly anaerobic, aerobic or anoxic environment, certain advantages over the prior art are realized. In particular, the invention is (1) capable of reducing higher perchlorate concentrations, greater than 9000 mg/l in a single stage reactor system and greater than 15,000 mg/l in a multi-stage system; (2) capable of higher reduction rates than previously reported, greater than 0.7 g/l per hour; (3) capable of reducing anions ($ClO_4^-$, $ClO_3^-$, $NO_3^-$, $NO_2^-$) in the presence of high salt concentrations (>3.4% total dissolved solids); (4) capable of reducing perchlorate and alkaline hydrolyzed energetics simultaneously; (5) capable of reducing greater than 18,000mg/l of nitrate ($NO_3^-$) in a single stage system; (6) capable of maintaining anion ($ClO_4^-$, $ClO_3^-$, $NO_3^-$, $NO_2^-$) reducing capability over extended periods (>2 weeks), without anions present; (6) capable of maintaining $ClO_4^-$ reduction capability at $ClO_4^-$ concentrations of <1.5 ppm; (7) capable of effectively using low-cost nutrients (e.g., cheese whey, whole yeast, milk and brewery waste and sugar/starch-based carbohydrate wastes, etc.,) and combinations of low-cost nutrients; (8) capable of effectively treating contaminated ground water with or without a preliminary concentration step; (9) capable of reducing anions ($ClO_4^-$, $ClO_3^-$, $NO_3^-$, $NO_2^-$)in NaCl brine from ion exchange concentration processes; and (10) capable of effectively reducing chromium VI to relatively insoluble chromium III compounds.

It is therefore an object of the present invention to provide a method for effectively treating wastewaters contaminated with perchlorate, nitrate, hydrolysates and other energetic materials.

It is another object of the present invention to provide a method for reducing perchlorate, nitrate, hydrolysates and other energetic materials present in wastewaters using a specific bacterium, *Wolinella succinogenes*, in a mixed culture and in a controlled microaerobic environment.

It is a further object of the present invention to provide a method for effectively and easily maintaining a microaerobic environment.

It is also an object of the present invention to treat wastewaters with high concentrations of perchlorate, nitrate, hydrolysates and other energetic materials and at high perchlorate reduction rates, in a simple and cost effective manner.

These and other objects of the present invention will become apparent from the detailed description and examples which follow.

SUMMARY OF THE INVENTION

In accordance with one embodiment, the present invention provides a method for the treatment of wastewaters and the like, suspected of being contaminated with perchlorates, nitrates, hydrolysates and other energetic materials, comprising:

(a) providing at least one microaerobic reactor containing a mixed bacterial culture capable of reducing perchlorates, nitrates, hydrolysates and other energetic materials;

(b) feeding wastewater, suspected of being contaminated, to the at least one microaerobic reactor;

(c) maintaining a microaerobic environment in the microaerobic reactor by at least one method selected from the group consisting of (i) mixing air and nitrogen gas and sparging or purging the reactor with the gas mixture; (ii) using a nitrogen membrane separator to provide a low oxygen-containing nitrogen gas to the reactor for sparging or purging; (iii) adding air to the reactor for sparging or purging to maintain a target dissolved oxygen concentration or a target oxygen concentration in head space gas present in the reactor; and (iv) maintaining chlorate, nitrate and perchlorate concentration in the feed; and (d) maintaining suitable nutrient and environmental conditions in the microaerobic reactor.

In accordance with a second embodiment, the present invention provides a single-stage or a multi-stage microaerobic system comprising:

at least one microaerobic reactor for treatment of contaminated wastewater and the like and containing a mixed bacterial culture capable of reducing perchlorates, nitrates, hydrolysates and other energetic materials;

feed stream means for feeding contaminated wastewater or the like into the at least one microaerobic reactor;

a microaerobic environment control means for controlling the environment in the at least one microaerobic reactor; and a treated wastewater discharge system.

In accordance with a third embodiment, the present invention provides a method for reducing perchlorates, nitrates, hydrolysates and other energetic materials in a microaerobic bio-degradation system, the method comprising:

(a) feeding wastewater or the like suspected of being contaminated with perchlorate, nitrate, hydrolysates and other energetic materials into a microaerobic reactor containing a mixed culture of bacterium and maintaining a suitable microaerobic environment in the microaerobic reactor so as to effectively biodegrade perchlorates, nitrates, hydrolysates and other energetic materials present in the reactor;

(b) optionally feeding the microaerobically treated wastewater or the like from step (a) to at least one other reactor or series of other reactors selected from the group consisting of suspended growth continuously-stirred-tank reactors (CSTR), fixed-film reactors, sludge-bed reactors and activated sludge reactors;

(c) feeding the treated wastewater and the like from step (a) and/or step (b) into a clarifier, and (d) recycling the treated and clarified wastewater from step (c) back to the microaerobic reactor.

By the above method(s), treated wastewaters can be discharged for treatment directly to conventional sewage treatment systems.

BRIEF DESCRIPTION OF DRAWINGS

FIG. 2 is a graph illustrating the effects of oxygen concentration on perchlorate concentration in a microaerobic reactor according to the present invention.

DESCRIPTION OF PREFERRED EMBODIMENTS

Figure 1:
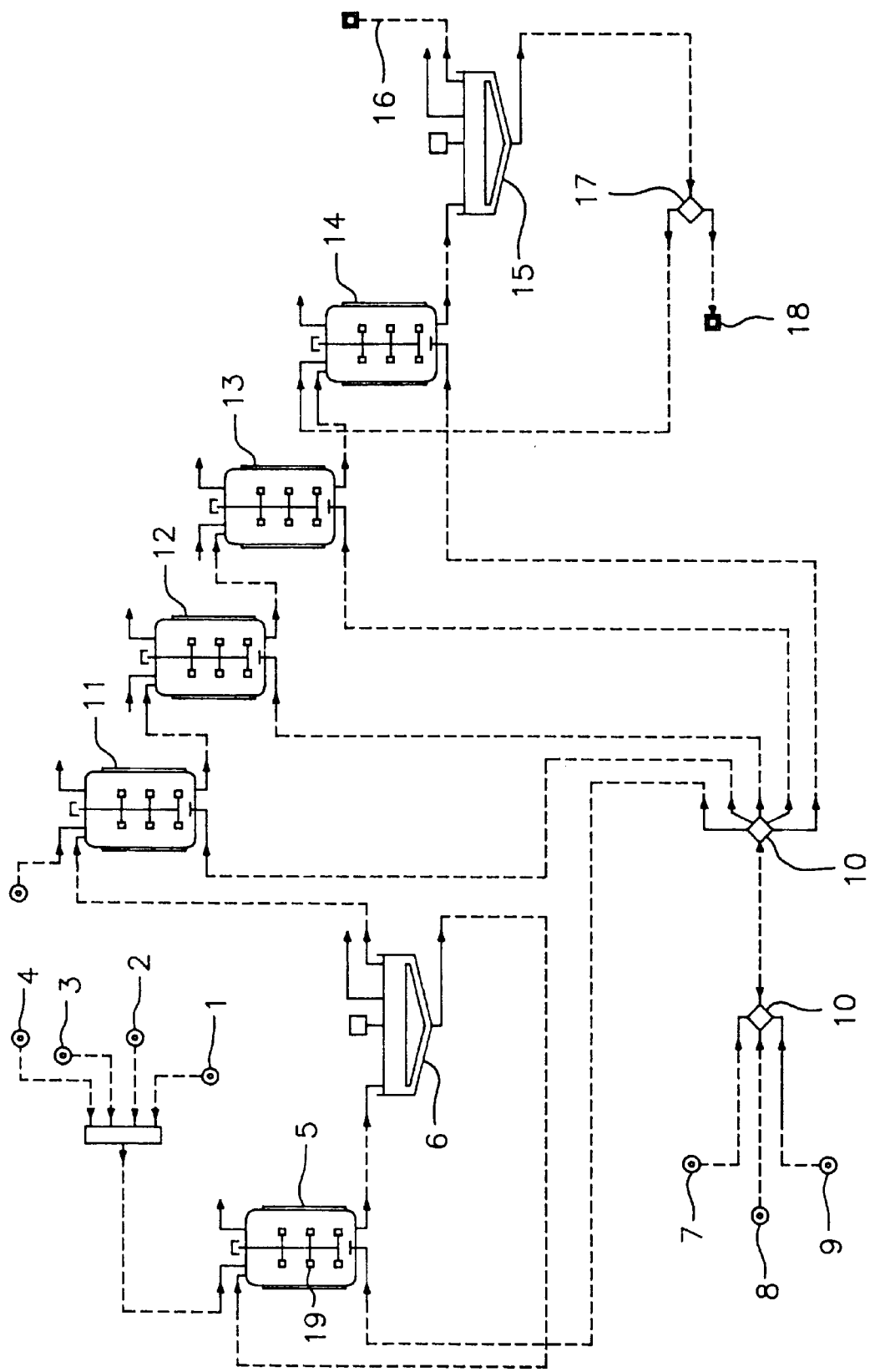
FIG. 1 is a schematic representation of a microaerobic multi-stage bio-degradation process.

The microorganism which reduces perchlorate, nitrate, hydrolysates and other energetic materials, *Wollinena succinogenes*, has the characteristics set forth in Bergey's Manual of Determinative Bacteriology, Ninth Edition, expressly incorporated herein by reference, as if individually set forth. A mixed culture of *Wollinena succinogenes* is deposited with the American Type Culture Collection Patent Depository, 12301 Parklawn Drive, Rockville Md. 20852 and has been given ATCC Number 29543.

With reference to FIG. 1, contaminated wastewater and the like (hereinafter "wastewater") enters the system via inlet 1, along with a dilution stream 2, e.g. water or other suitable media for dilution as required, a pH adjustment stream 3, e.g. containing acid, caustic soda or other suitable media for controlling pH, and a nutrient stream 4. The use of independently controlled multiple feed streams for each of wastewater 1, water 2, pH adjustment 3 and nutrients 4 is preferred and has several advantages, which are as follows: (1) saturated brine effluents containing greater than 27% salts can be fed directly to the bioreactor system; (2) saturated perchlorate, nitrate and hydrolysate effluents containing greater than 12% perchlorate can be fed directly into the bioreactor system; (3) brine effluents and concentrated perchlorate effluents can be fed simultaneously through independent feed streams without salt precipitation; (4) brine and concentrated perchlorate, nitrate and hydrolysate effluents can be mixed and diluted to concentrations which optimize process performance and cost; and (5) nutrient consumption can be optimized for performance and cost. The mix, which may have been optionally pre-treated depending on the concentrations of perchlorates etc., is fed to a microaerobic reactor 5 wherein the perchlorates, nitrates, hydrolysates and other energetic materials are reduced by the mixed culture containing the bacterium, Wolinella sp. which is present in the reactor 5. In a single stage reactor system, perchlorate concentrations as high as 9,000 mg/l, can be treated. In a multi-stage reactor system, perchlorate concentrations as high as 15,000 mg/l, can be treated. This concentration is based on the total wastewater feed stream entering the reactor.

The microaerobic reactor 5 is preferably a sludge bed reactor and its microaerobic environment is controlled by one of four methods, (1) feeding a mixture of air and nitrogen gas and sparging or purging the reactor 5 with this mixture as appropriate; (2) using a nitrogen membrane separator to provide a low-oxygen containing nitrogen gas to the reactor 5; (3) adding air to the reactor 5 for sparging and purging as appropriate and (4) maintaining a chlorate, nitrate and perchlorate concentration in the feed. Each of these methods used alone, or separately, maintain a target dissolved oxygen concentration in the liquid present in the reactor 5 or a target oxygen concentration in head space gas. The sparging and purging gas control means 10 may be any type of control mechanism, electronic or pneumatic. For example, in a nitrogen membrane system manual adjustment of pressure and flow rates controls the nitrogen purity. The same control means may also control the environment in other reactors which may be present in the system.

The operating conditions for perchlorate reduction in the microaerobic reactor 5 may vary depending on the nature and composition of the wastwater/effluent being treated. With this in mind, the temperature is preferably maintained between about 10–42° C., most preferably between about 20–35° C. The residence time (RT) for the wastewater or effluent being treated in the reactor 5 is preferably between about 2–48 hours, most preferably between about 6–18 hours. The perchlorate feed concentrations may be anywhere between about <1–>15,000 mg/l. Preferably the feed concentrations are between about <1–9,000 mg/l when a single-stage system is used and between about <1–15,000 mg/l when a multi-stage system is used. The nitrogen feed concentration can be approximately >18,000 mg/l for a single-stage system. The nutrient feed ratio, if $ClO_4^-$ is greater than 100 mg/l, is preferably between about 1:1–10:1 g(nutrient):g($ClO_{4-}$). The nutrient feed concentration is preferably between about 1–32 g/l. The amount of total dissolved solids in the reactor 5 is preferably between about 1–34 g/l. The pH within the reactor 5 is preferably maintained between about 6.5–7.6. The oxygen concentration in the sparge gas is preferably maintained between about 0.1–4.0 vol %.

Following treatment in the microaerobic reactor 5, the treated wastewater/effluent may be fed to a primary clarifier 6, which is optional, depending on the nature and composition of the effluent being treated and the nutrients used. The primary clarifier concentrates nutrients and microbial biomass. Specifically, the use of such enables the nutrients to be completely digested to soluble components, recycling back to the microaerobic reactor, and the microbial biomass to be concentrated in sludge-bed reactors. This also enables the efficient utilization of low cost, partially insoluble nutrients and results in very high reactor activity. Such also enables fixed-film reactors to be used in subsequent stage of a multi-stage system, which would have ordinarily required soluble nutrients i.e., partially insoluble nutrients are useable in fixed-film reactors.

If a primary clarifier is used, the clarified effluent may be recycled back into the microaerobic reactor 5. The treated effluent, whether clarified or not, may also be fed to a series of optional reactors 11, 12 and 13, for further treatment, in a multi-stage reactor system. When such optional reactors are not used the system is referred to as a single stage system. Secondary clarifiers may also be optionally used, as shown in FIG. 1.

Optional reactors 11, 12 and 13 may be suspended growth continuously stirred tank reactors (CSTR), fixed film reactors operated in anaerobic, microaerobic or aerobic modes or sludge bed reactors. Whether such optional reactors are used and what modes they are run under depends on the nature and composition of the effluent being treated.

The use of staging up to five reactors in series, as shown in FIG. 1, has several additional advantages to the single stage system. The concentrations of perchlorate in effluent fed to the reactor 5 can be as high as 15,000 mg/l, (or approximately 1.5 wt % of the total wastewater stream) which is much higher than previously demonstrated. Through sequential addition of nutrients and controlling the microaerobic environment, the perchlorate may be reduced to below detectable limits in the second and third reactors. Microaerobic reactors followed by aerobic reactors, as the second, third and fourth reactor stages, respectively, will first reduce the toxic inorganic anions and then aerobically oxidize organic energetics or energetic hydrosylate components and reduce the effluent biological oxygen demand (BOD) to a level that can be discharged into municipal sewage treatment plants. It has been found that the subsequent reactor stages can be independently configured to enable any combination of anaerobic, microaerobic or aerobic continuously-stirred-tank reactors, fixed-film reactors or sludge-bed reactors. Such is configured depending on the nature and composition of the effluent being treated and nutrient requirements. Effluents with high perchlorate and solids concentrations are best reduced in continuously-stirred-tank reactors or in sludge-bed reactors. Effluents with low perchlorate and solids concentrations are best reduced in fixed-film reactors. Mixing of reactor contents is carried out using mechanical stirrers 19 or by any suitable mixing process.

Whether treated in a single stage reactor system or a multi-stage system, the treated effluent is fed to an activated sludge reactor 14 if further BOD reduction is required and is then fed to a secondary clarifier 15, which is required for an activated sludge process. The treated effluent may then be discharged directly to conventional sewage treatment systems 16. The sludge may be recycled 17 either back into the activated sludge reactor 14 or is fed to a further sludge waste treatment system 18.

Perchlorate contaminated wastewater and the like may concentrated using in an ion exchange process. The decontaminated wastewater and the like is returned to an appropriate water supply system or alternatively to an aquifier. The now concentrated perchlorate effluent is then fed to the microaerobic reactor system. If the perchlorate contaminated wastewater does not need to be concentrated, it may be fed directly to the microaerobic reactor and into the system illustrated in FIG. 1 whereby aerobic BOD reduction is carried out if necessary and is eventually discarded into a conventional sewage treatment system.

The nutrient medium in the process of the present invention may be a low cost nutrient medium. This is an important advantage since the nutrient is a primary operating expense in the system. The nutrient medium according to the present invention can be one or any combination of the following nutrients; brewer's yeast, cheese whey, corn starch, corn liquors, corn syrups, sugars, acetate, alcohols, and food process wastes. Food process wastes are sugar and carbohydrate-based material that may include but are not limited to: brewery wastes; milk, cheese, and ice cream wastes; juice and soft drink bottling wastes; candy, cereal, and sweetened foodstuff wastes.

Using food process wastes for nutrients substantially reduces the cost when compared to other conventional chemical and physical waste treatment processes.

It has also been found that base hydrolysis pre-treatment of energetic materials, solids and sludges, removes the energetic nature of these materials and dissolves them so that they can be biodegraded. Base hydrolysis pre-treatment, typically carried out using sodium hydroxide or potassium hydroxide, although any similar base is contemplated, yields hydrosylate components such as formate, acetate, nitrite, nitrate, formaldehyde and glycerol that are biodegradable, and can provide a nutrient source for the microaerophillic mixed culture. By this means, degradation of any solid energetic material, by-product/sludge or aqueous effluent is possible. Both organic and typical inorganic anions (including perchlorate, chlorate, nitrate and nitrite compounds) are also reduced, in particular, after base hydrolysis (see Example 2).

By the method of the present invention, complete reduction of energetic materials to their mineral component is obtainable. For example, $ClO_4^-$, $ClO_3^-$, $NO_3^-$ and $NO_2^-$ may be completely reduced by the method of the present invention, even in the presence of their associated cations such as, ammonia, sodium and potassium, and other cations. These anions are also reduced completely in the presence of high salt concentrations, in excess of 3.4% total dissolved solids (TDS) and in the presence of dissolved energetic components, such as nitroaromatics, nitramines and nitroglycerine (NG).

In accordance with the present invention the term "wastewater" is given its meaning in the art and also means process groundwater, drinking water, ion exchange brines and soil wash water. The term "energetic materials" or "energetic products" means any energetic or explosive materials such as, nitramines, nitroaromatics, oxidizers, plasticizers, binders, nitroglycerine (NG), nitrocellulose (NC), ammonium perchlorates, nitrates, nitrites and hydrolysate products i.e., hydrolyzed energetic products. The term "microaerobic environment" means an environment having levels of oxygen lower than that used for aerobic environments, for example, oxygen levels, at least in the head space gas, of between approximately 0.1–4.0% oxygen. The term "oxygenated ions and/or molecules" means oxygenated ions such as $NO_3^-$ $ClO_3^-$, $PO_4^{2-}$, $SO_4^{2-}$, acetate, formate and the like and/or oxygenated molecules such as alcohols, sugars, carbohydrates and the like.

The invention will now be described by way of reference to the following examples which are not intended to limit the scope of the present invention.

EXAMPLE 1

The major constituents of a highly contaminated groundwater are shown in following table.

TABLE 1

Composition of a Highly Contaminated Groundwater

| Component | Concentration, mg/l | Component | Concentration, mg/l |
|---|---|---|---|
| Perchlorate, $ClO_4^-$ | 1200–1500 | Calcium, $Ca^{+2}$ | 800 |
| Chlorate, $ClO_3^-$ | 3000–3500 | Magnesium, $Mg^{+2}$ | 400 |
| Sulfate, $SO_4^-$ | 1700 | Nitrate, $NO_3^-$ | 200 |
| Chloride, $Cl^-$ | 2000 | Boron | 14 |
| Sodium, $Na^+$ | 1800 | Chrome (VI) | 9 |

A carbohydrate, sugar and starch-based food waste nutrient was combined with the ground water in Table 1 and fed to a microaerobic reactor from a 20-liter carboy. The nutrient concentration in the feed was adjusted to 6 g/l (4:1 nutrient to perchlorate ratio). Ammonium hydroxide (~30% $NH_4OH$) was also added to the feed tank at rates from 0.1 to 1.0 ml/l to increase the feed pH, prevent unwanted microbial growth, and provide additional nitrogen. The feed mixture was agitated and pumped by means peristaltic pump into a nominal 7-liter continuously stirred tank reactor (CSTR) (5.75-liter working volume) at a rate of 6.0 ml/min. The hydraulic residence time (HRT) based on this feed rate is approximately 16 hours. The reactor temperature was maintained at 30° C. The pH in the CSTR was controlled in a range from 6.5–7.6 by the automatic addition of NaOH or $H_3PO_4$ as required. Reactor effluent was fed to a clarifier and sludge recycled and wasted at rates to maintain total suspended solids in the reactor between 5000 and 10,000 mg/l. Analysis by ion chromatography showed that nitrate and chlorate were reduced to non-detectable concentrations simultaneously with perchlorate. Perchlorate was reduced to non-detectable (<4 ppb) concentrations. A chloride balance showed that >97% of the chloride was accounted for and confirmed that the chlorate and perchlorate were being reduced to chloride and not being accumulated in the biomass. Chrome (VI) concentration was reduced to 0.2 mg/l.

EXAMPLE 2

The experimental apparatus for this example was the same as in example 1. Effluent from nitroglycerine (NG) production operation is hydrolyzed with NaOH at elevated temperature to produce a high nitrate effluent that is 1–5% nitrate. In this example feed was prepared by adding a carbohydrate sugar/starch food waste to the feed carboy at a concentration of 15 g/l. Feed nitrate concentration was 12,050 mg/l, nitrite was 585 mg/l, and sulfate was 5500 mg/l. The total dissolved solid (TDS) was 3.2%. Caustic was not added to the feed, however, antifoam was added to prevent the foaming caused by nitrogen gas generation in the denitrification reaction. The CSTR was operated at an hydraulic residence time (HRT) of 24 hours, temperature maintained at 30° C., and pH controlled at 6.5–7.6. In this example all of the nitrate and nitrite was reduced to nitrogen gas as confirmed by ion chromatography.

EXAMPLE 3

Brine from the regeneration of ion exchange resin contains perchlorate and other ions. Table 2 shows the composition of actual brine from an ion exchange demonstration in the San Gabriel Basin and surrogate brine with an elevated perchlorate concentration.

TABLE 2

| Component | Surrogate Brine, mg/l | San Gabriel Brine, mg/l |
|---|---|---|
| Total Dissolved Solids, TDS | 34,000 (3.4%) | ~34,000 (3.4%) |
| Salt, NaCl | 31,500 (3.15%) | 31,700 (3.17%) |
| Sulfate | 1260 | 1900 |
| Nitrate | 360 | 350 |
| Perchlorate | 90 | 1.4 |
| Carbonate | 90 | |
| $Ca^{+2}$, $Mg^{+2}$, $K^+$ | 45 | ~50 |

In this example the CSTR had a 2.5-liter hydraulic volume and a clarifier was not employed as a mechanism to concentrate and recycle biomass. The actual salt concentration of the regenerating brine was 7.0% NaCl. To ensure the high salt concentration would not inhibit perchlorate biodegradation, the actual brine was diluted with water to 45% of its original concentration which resulted in a 3.15% NaCl and 3.4% TDS feed material. The surrogate was prepared, using water softener salt. The reactor was operated at an HRT of 24 hours, temperature maintained at 35° C. and pH controlled between 6.5 and 7.6. In this example, both the nitrate and perchlorate were destroyed to non-detectable concentrations (<4 ppb for $ClO_{4-}$).

EXAMPLE 4

The effect of oxygen concentration on perchlorate concentration in a microaerobic reactor according to the present invention was investigated. Wastewater with a concentration of 5,000 mg/l perchlorate and was fed to a microaerobic reactor containing a mixed bacteria culture with bacterium of the species *Wolinella succinogenes*. Gas containing a mixture of nitrogen and air was sparged into the microaerobic reactor at various flow rates and various concentrations (vol %) over a 30 day period. Air and nitrogen were metered and mixed together to create a sparge gas with different oxygen concentrations. The sparge flow rate was varied in order to adjust the total rate at which oxygen was fed into the reactor. The other conditions in the reactor remained unchanged, wherein the temperature was maintained at 35° C.; the nutrient feed ratio was maintained at 2.4:1; the residence time was 18 hours and the pH was maintained between 6.5–7.5. The nutrient used was BYF-100. The results are illustrated in FIG. 2. From the graph in FIG. 2 it can be seen that the reactor perchlorate concentration steadily decreased with an increase in oxygen concentration.

What is claimed is:

1. A method for the treatment of wastewater, suspected of being contaminated with perchlorates, nitrates, hydrolysates and other energetic materials, comprising:
   (a) providing at least one microaerobic reactor containing a mixed bacterial culture capable of reducing perchlorate, nitrate, hydrolysates and other energetic products;
   (b) feeding contaminated wastewater into the microaerobic reactor;
   (c) maintaining a microaerobic environment in the microaerobic reactor by at least one method selected from the group consisting of (i) mixing air and nitrogen gas and sparging or purging the reactor with the gas mixture; (ii) using a nitrogen membrane separator to provide a low oxygen-containing nitrogen gas to the reactor for sparging or purging; (iii) adding air to the reactor for sparging or purging as necessary to maintain a target dissolved oxygen concentration or a target oxygen concentration in head space gas present in the reactor; and (iv) adding and/or maintaining oxygenated ions and/or oxygenated molecules; and
   (d) maintaining suitable nutrient and environmental conditions in the microaerobic reactor so as to cause decontamination of the contaminated wastewater.

2. The method of claim 1, wherein the mixed bacterial culture contains bacterium of the species Wolinella succinogenes, effective in reducing perchlorates, nitrates, hydrolysates and other energetic materials.

3. The method of claim 1, wherein the microaerobic environment is controlled such that headspace gas in the microaerobic reactor contains an oxygen concentration of between 0.1–4.0 volume %.

4. The method of claim 1, wherein the proper nutrient conditions comprises a ratio of nutrient to $ClO_4^-$ of between 1:1 to 10:1 grams.

5. The method of claim 1, further comprising maintaining the temperature at between 10–42° C.

6. The method of claim 1, further comprising maintaining the pH between 6.5–7.6.

7. The method of claim 1, further comprising treating the wastewater in the reactor for a period of between 2–48 hours.

8. The method of claim 1, further comprising feeding wastewater contaminated with perchlorate at concentrations greater than 15,000 mg/l of wastewater.

9. The method of claim 1, further comprising feeding the treated wastewater to an activated sludge reactor for further processing and after further processing, feeding the treated wastewater to a primary clarifier.

10. The method of claim 9, further comprising providing a secondary clarifier and feeding treated wastewater from the microaerobic reactor to the second clarifier, prior to feeding to the activated sludge reactor.

11. The method of claim 1, further comprising feeding the treated wastewater from the microaerobic reactor to at least one other reactor or series of other reactors, of a type selected from the group consisting of continuously-stirred tank reactors, fixed film reactors and sludge-bed reactors, operated under conditions selected from the group consisting of microaerobic conditions, anaerobic conditions and aerobic conditions, prior to feeding to the activated sludge reactor.

12. The method of claim 1, wherein the microaerobic reactor is an activated sludge reactor.

13. A microaerobic biodegradation system for treatment of wastewater suspected of being contaminated with perchlorates, nitrates, hydrolysates and other energetic materials, the system comprising:
   at least one microaerobic reactor for treatment of incoming contaminated wastewater and the likes, said microaerobic reactor containing a mixed bacterial culture capable of reducing perchlorates nitrates, hydrolysates and other energetic materials;
   a microaerobic environment control means for controlling the environment in the at least one microaerobic reactor;
   feed stream means for supplying the contaminated wastewater to the at least one microaerobic reactor; and
   a treated wastewater discharge system.

14. The system of claim 13, wherein the mixed bacterial culture contains bacterium of the species Wolinella succinogenes.

15. The system of claim 13, wherein the microaerobic environment control means controls the level of oxygen in headspace gas in the microaerobic reactor to between 0.1–4.0 vol %.

16. A method for reducing perchlorates, nitrates, hydrolysates and other energetic materials in a microaerobic biodegradation system, said method comprising:
   (a) feeding a wastewater suspected of being contaminated with perchlorates, nitrates, hydrolysates and other energetic materials into a microaerobic reactor containing a mixed culture of bacterium and maintaining a suitable microaerobic environment in the microaerobic reactor so as to effectively biodegrade the perchlorates, nitrates, hydrolysates and other energetic products;
   (b) optionally feeding the treated wastewater from step (a) to at least one other reactor or series of other reactors selected from the group consisting of suspended growth continuously-stirred tank reactors, fixed film reactors and sludge-bed reactors, operated under conditions selected from the group consisting of microaerobic conditions, aerobic conditions and anaerobic conditions; and
   (c) feeding the treated wastewater from step (a) and/or step (b) into an activated sludge reactor for further processing prior to being discharged from the biodegradation system.

17. The method of claim 16, wherein the mixed bacterial culture contains bacterium of the species Wolinella succinogenes.

18. The method of claim 16, further comprising feeding wastewater containing perchlorate at a concentration of greater than 15,000 mg/l of the wastewater.

19. The method of claim 16, further comprising pretreating the contaminated wastewater in an ion exchange process prior to feeding to the microaerobic reactor.

* * * * *